United States Patent
Kobayashi et al.

(10) Patent No.: US 10,145,459 B2
(45) Date of Patent: Dec. 4, 2018

(54) WAVE GENERATOR AND STRAIN WAVE GEAR DEVICE

(71) Applicant: HARMONIC DRIVE SYSTEMS INC., Shinagawa-ku, Tokyo (JP)

(72) Inventors: Masaru Kobayashi, Azumino (JP); Tatsuro Hoshina, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 336 days.

(21) Appl. No.: 15/124,788

(22) PCT Filed: Mar. 11, 2014

(86) PCT No.: PCT/JP2014/056352
§ 371 (c)(1),
(2) Date: Sep. 9, 2016

(87) PCT Pub. No.: WO2015/136622
PCT Pub. Date: Sep. 17, 2015

(65) Prior Publication Data
US 2017/0016523 A1    Jan. 19, 2017

(51) Int. Cl.
*F16H 35/00* (2006.01)
*F16H 49/00* (2006.01)

(52) U.S. Cl.
CPC .................. *F16H 49/001* (2013.01)

(58) Field of Classification Search
CPC .................................................. F16H 49/001
USPC ......................................................... 74/640
See application file for complete search history.

(56) References Cited

U.S. PATENT DOCUMENTS

| | | | | |
|---|---|---|---|---|
| 6,302,073 B1* | 10/2001 | Heer | ......................... | F01L 1/34 123/90.15 |
| 6,564,677 B1* | 5/2003 | Kiyosawa | ............... | F16H 35/10 475/162 |
| 6,817,267 B2* | 11/2004 | Kobayashi | ............ | F16H 49/001 74/640 |
| 7,124,658 B2* | 10/2006 | Fischer | .................. | F16H 29/18 74/111 |

(Continued)

FOREIGN PATENT DOCUMENTS

| | | |
|---|---|---|
| JP | 2-217612 A | 8/1990 |
| JP | 2005-163993 A | 6/2005 |
| JP | 2009-299780 A | 12/2009 |

(Continued)

OTHER PUBLICATIONS

International Search Report (PCT/ISA/210) dated Jun. 10, 2014, by the Japanese Patent Office as the International Searching Authority for International Application No. PCT/JP2014/056352.

*Primary Examiner* — Ha Dinh Ho
(74) *Attorney, Agent, or Firm* — Buchanan Ingersoll & Rooney PC (57) ABSTRACT

The wave generator of the strain wave gear device comprises: a rigid plug; a roller bearing fitted on the elliptical outer circumferential surface thereof; and first and second cylindrical springs, which press loose rollers that have some play in the radial direction between the outer race and the inner race of the roller bearing against the outer raceway surface. The loose rollers are pressed against the outer raceway surface with a linear contact and roll according to the outer raceway surface. Skewing of the rollers is limited, ensuring smooth rotation of the roller bearing.

14 Claims, 4 Drawing Sheets

(56) References Cited

U.S. PATENT DOCUMENTS 7,549,357 B2 * 6/2009 Hammerbeck ........... F16H 1/32
                                                    475/162
8,869,651 B2 * 10/2014 Yeh ........................ F16H 1/10
                                                    74/640

FOREIGN PATENT DOCUMENTS

JP          2011-158072 A        8/2011
JP          2011-190826 A        9/2011

* cited by examiner

WAVE GENERATOR AND STRAIN WAVE GEAR DEVICE

TECHNICAL FIELD

The present invention relates to a wave generator of a strain wave gear device, and particularly relates to a wave generator comprising a roller bearing.

BACKGROUND ART

A wave generator of a strain wave gear device commonly comprises a rigid plug (a rigid cam plate) having an ellipsoidal outer circumferential surface, and a wave bearing fitted on the outer circumferential surface, a ball bearing being used as the wave bearing. Patent Document 1 proposes a strain wave gear device comprising a wave generator which uses a needle bearing as the wave bearing.

PRIOR ART DOCUMENTS

Patent Documents

Patent Document 1: JP-A 2011-190826

SUMMARY OF THE INVENTION

Problems to be Solved by the Invention

In a wave generator of a strain wave gear device, a wave bearing is made to flex into an ellipsoidal shape by a rigid plug. Rolling elements positioned at and near the ends of the major axis of the ellipsoidal shape of the wave bearing are tightly enclosed between inner and outer races. The remaining rolling elements have some play between the inner and outer races. Particularly, rolling elements positioned at the ends of the minor axis can be given more play in the radial direction than rolling elements positioned in other locations.

With a wave generator that uses a needle bearing or another roller bearing, the rollers are in line contact with the raceway surfaces (rolling surfaces) of inner and outer races. When the rollers do not face in a direction perpendicular to the circumferential direction of the raceway surfaces, i.e., when the rollers come to be skewed, the rollers can no longer roll smoothly along the raceway surfaces. As described above, rollers positioned in locations other than at or near the ends of the major axis are in a loose state with some play in the radial direction between the raceway surfaces of the inner and outer races, and these loose rollers readily become skewed. When skewed rollers roll along the raceway surfaces of the inner and outer races, from positions on the minor axis of the wave bearing toward positions on the major axis, the rollers sometimes come to be in a tight state in which they are restrained in the raceway surfaces of the inner and outer races while remaining skewed. When skewed rollers come to be in a tight state, the rollers can no longer rotate smoothly.

The rollers of the wave bearing also repeatedly go through an elliptical motion as the ellipsoidal rigid plug rotates, and the range of the elliptical motion of the rollers is greater than the roller diameter. When the wave bearing comprises a roller retainer for holding the rollers at fixed intervals in the circumferential direction, it is essential that the inside diameter of pockets in the roller retainer is made to be greater than the roller diameter so that an appropriate gap is provided between the pocket inner circumferential surfaces and the rollers, whereby the elliptical motion of the rollers is not impeded. This gap increases in correspondence with a decrease in the velocity ratio in the strain wave gear device. Consequently, the rollers readily come to be skewed in a strain wave gear device having a low velocity ratio, and the skewed rollers will very likely assume a tight state in the major-axis end locations of the wave bearing and will no longer be able to rotate smoothly.

An object of the present invention is to provide a wave generator comprising a roller bearing in which rollers are held so as to not become skewed. Another object of the present invention is to provide a strain wave gear device comprising this wave generator.

Means to Solve the Problems

To solve the problems described above, the wave generator of the strain wave gear device of the present invention is characterized by comprising:

a rigid member having an outer circumferential surface with a contour defined by a non-circular curve;

a roller bearing fitted to the outer circumferential surface and made to flex into a non-circular shape; and a roller-pressing member for pressing loose rollers disposed in a state of having some play in the radial direction between an outer race and inner race of the roller bearing, the loose rollers being pressed in a direction toward an outer raceway surface of the outer race;

the non-circular curve being a closed convex curve, e.g., an ellipsoidal curve inscribed in a circle at a plurality of locations at equiangular intervals.

In the wave generator of the present invention, loose rollers are pressed by the roller-pressing member against the outer raceway surface so as to have no play. Because the rollers roll according to the outer raceway surface, skewing of the rollers is limited or prevented. Consequently, at the ends of the major-diameter positions of the roller bearing made to flex into a shape conforming to a non-circular curve by the non-circular outer circumferential surface of the rigid member, skewed rollers are limited or prevented from coming to be in a tight state, and smooth rotation of the roller bearing can be ensured.

It is preferable for the roller-pressing member to be a cylindrical member or a ring member. In this case, the cylindrical member or the ring member is disposed coaxially with the outer circumferential surface. The outside-diameter dimension of the cylindrical member or the ring member is set to a dimension greater than the minor-diameter dimension of the inner raceway surface of the inner race of the roller bearing made to flex along a non-circular curve.

Each of the rollers positioned at or near the ends at the minor-diameter positions of the roller bearing made to flex in a shape conforming to a non-circular curve is pushed radially outward and held in a state of contact with the outer raceway surface by the cylindrical member or the ring member which has an outside-diameter dimension greater than the minor-diameter dimension of the inner raceway surface. Skewing of the rollers can thereby be limited or prevented.

In the present invention, the roller-pressing member can be fitted to the rigid member. When the roller bearing has a roller retainer for holding each of the rollers at predetermined intervals along the circumferential direction in the raceway of the roller bearing, the roller-pressing member can be fitted to the roller retainer.

The roller-pressing member can be a cylindrical member or a ring member having a shape divided at a single location in the circumferential direction. In this case, the ends on both sides divided in the roller-pressing member are joined to one location in the outer circumferential surface portions positioned at the major-diameter ends in the outer circumferential surface of the rigid member. The joining of the both ends is carried out so as to establish a state in which, in the minor-diameter positions of the inner raceway surface of the inner race of the roller bearing made to flex along an ellipsoidal curve, the outside-diameter dimension of the roller-pressing member is greater than the minor-diameter dimension of the inner raceway surface in the minor-diameter positions.

In this case, the positions where the ends at both sides of the roller-pressing member are joined are adjusted and the ends are joined at the adjusted positions so that the rollers are appropriately pressed by the portions of the roller-pressing member positioned at both ends of the minor diameter in the roller bearing. It is thereby possible to lessen the manufacturing dimensional precision of the roller-pressing member and the manufacturing dimensional precision of the portions where the roller-pressing member is attached in the rigid member.

In the present invention, it is preferable that first and second roller-pressing members are provided as the roller-pressing member, the first roller-pressing member urges one axial-direction end of each loose roller outward in the radial direction, and the second roller-pressing member urges the other axial-direction end of each loose roller outward in the radial direction.

In the present invention, it is preferable for the roller-pressing members to be capable of elastically deforming in the radial direction. The rollers can be reliably brought into contact with the outer raceway surface with a predetermined elastic force.

Steel, stainless steel, phosphor bronze, or plastic can be used as the material of the roller-pressing members.

BRIEF DESCRIPTION OF THE DRAWINGS

FIG. 1(a) is a schematic view of the strain wave gear device according to the present embodiment as seen from the front, and (b) is a schematic view showing a cross-sectional view thereof.

FIG. 2(a) is a front view showing the wave generator, (b) is a cross-sectional view of the portion sectioned along line 2b-2b, and (c) is a cross-sectional view showing Modification 1 of the wave generator.

FIG. 3(a) is an illustrative diagram of the wave generator in FIG. 2 as seen from the front, and (b) is an illustrative diagram of the wave generator sectioned along line 3b-3b.

FIG. 4(a) is a cross-sectional view showing Modification 2 of the wave generator of FIG. 2, and (b) is a cross-sectional view showing Modification 3 of the wave generator of FIG. 2.

MODE FOR CARRYING OUT THE INVENTION

Figure 1:
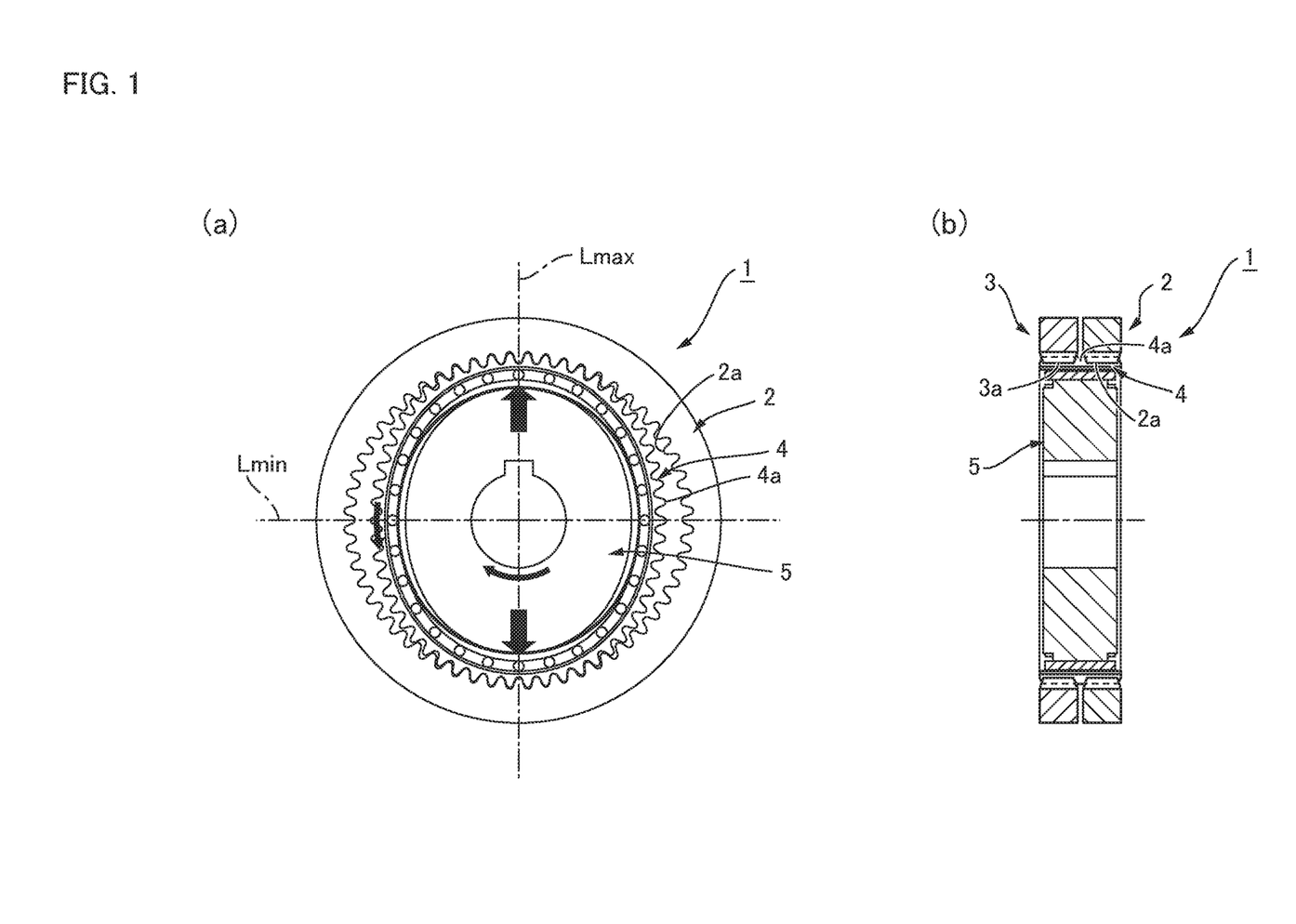

An embodiment of a strain wave gear device comprising a wave generator in which the present invention is applied is described below with reference to the drawings. FIG. 1(a) is a schematic view of the strain wave gear device according to the present embodiment as seen from the front, and (b) is a schematic view showing a cross-sectional view thereof.

The strain wave gear device 1 comprises a first rigid internally toothed gear 2, a second rigid internally toothed gear 3, a flexible externally toothed gear 4, and a wave generator 5. The flexible externally toothed gear 4 is made to flex into a shape conforming to an ellipsoidal curve by the wave generator 5, and the portions of the external teeth 4a positioned on the major axis Lmax of the ellipsoid respectively mesh with portions of the internal teeth 2a, 3a of the first and second rigid internally toothed gears 2, 3. When the wave generator 5 is rotated by a motor (not shown) or the like, the meshing positions between the first and second rigid internally toothed gears 2, 3 and the flexible externally toothed gear 4 move in the circumferential direction.

The number of teeth of the first rigid internally toothed gear 2 is 2n greater than the number of teeth of the second rigid internally toothed gear 3. The number of teeth of the second rigid internally toothed gear 3 is the same as the number of teeth of the flexible externally toothed gear 4, and the second rigid internally toothed gear 3 and flexible externally toothed gear 4 rotate integrally. For example, when the first rigid internally toothed gear 2 is fixed so as to not rotate, as the wave generator 5 rotates, the flexible externally toothed gear 4 rotates relatively by an amount equivalent to the difference in the number of teeth. The rotation of the flexible externally toothed gear 4 is outputted via the second rigid internally toothed gear 3.

Figure 2:
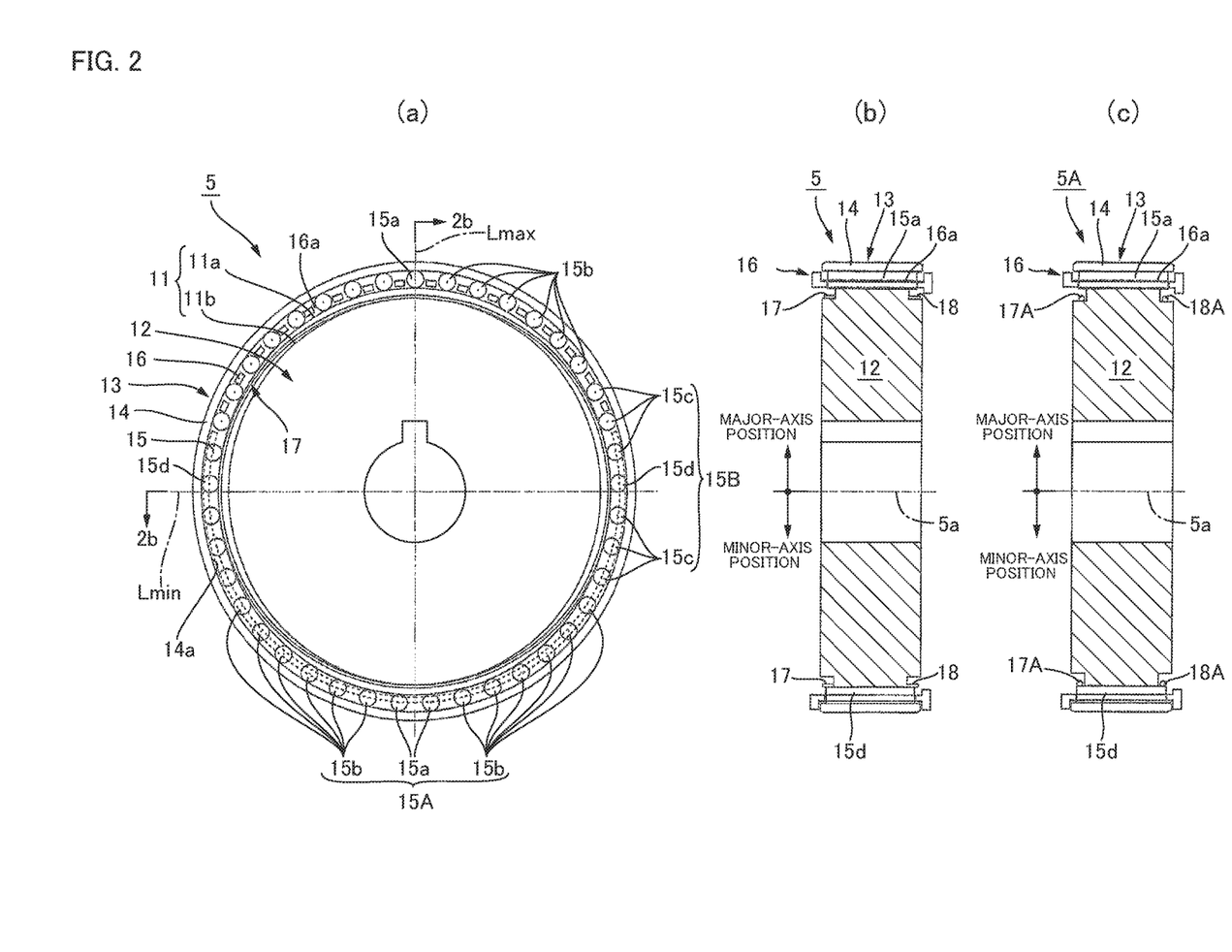

FIG. 2(a) is a front view showing the wave generator 5, and FIG. 2(b) is a cross-sectional view of the portion sectioned by line 2b-2b. The wave generator 5 comprises a rigid plug 12 which is a rigid member comprising an outer circumferential surface 11 having a contour prescribed by an ellipsoidal curve, and a roller bearing 13 fitted on the outer circumferential surface 11 and made to flex into a shape conforming to an ellipsoidal curve. In FIG. 2(a), the single-dashed line Lmax represents the major axis of the ellipsoidal outer circumferential surface 11, and the single-dashed line Lmin represents the minor axis.

The roller bearing 13 comprises an outer race 14, an inner raceway surface 11a formed in the outer circumferential surface 11, and numerous rollers 15 disposed in a raceway formed between an outer raceway surface 14a and the inner raceway surface 11a. The rollers 15 are inserted into pockets 16a of a cylindrical roller retainer 16 disposed in the raceway, and the rollers are aligned at constant intervals in the circumferential direction of the raceway. In the present example, the inner race is integrally formed in the outer circumferential surface 11, but a separate inner race may be fitted on the outer circumferential surface 11, as shall be apparent.

Generally, the rollers 15a positioned near the ends of the major axis Lmax of the ellipsoidal curve and a plurality of rollers 15b positioned on the sides thereof are tight rollers 15A disposed so as to be sandwiched between the outer raceway surface 14a and the inner raceway surface 11a. The remaining rollers 15c, 15d are loose rollers 15B disposed so as to have some play in the radial direction between the outer raceway surface 14a and the inner raceway surface 11a. The play of the loose rollers 15B is greatest in rollers 15d positioned at the ends of the minor axis positions Lmin, and the play progressively decreases from the minor axis Lmin to the major axis Lmax.

The wave generator 5 comprises roller-pressing members for pressing loose rollers 15B from among the rollers 15 against the outer raceway surface 14a. In the present example, first and second cylindrical springs 17, 18 having the same shape are provided as the roller-pressing members. The first and second cylindrical springs 17, 18 are fitted on the outer circumferential surface of the rigid plug 12.

Figure 3:
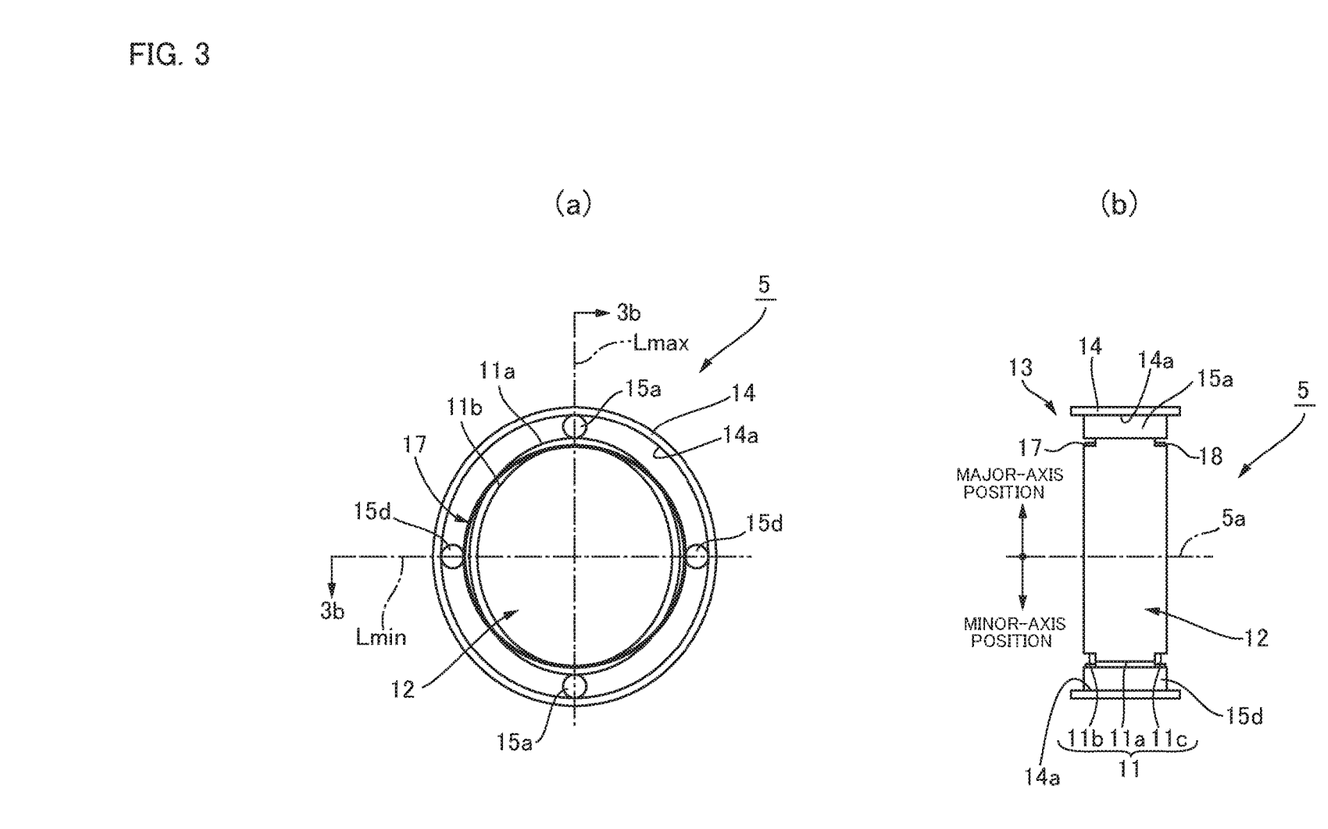

FIG. 3 includes illustrative diagrams for showing the manner in which the loose rollers 15B are pressed by the first and second cylindrical springs 17, 18 in an easily understandable manner, FIG. 3(a) being an illustrative diagram of the wave generator 5 as seen from the front, and FIG. 3(b) being an illustrative diagram of a cross section along line 3b-3b thereof. To give a description with reference to FIGS. 2 and 3, the rigid plug 12 is overall a discoid of fixed thickness. The outer circumferential surface 11 of the rigid plug 12 comprises the inner raceway surface 11a having the contour of an ellipsoidal curve, and a first step surface 11b and second step surface 11c formed in the widthwise ends of the inner raceway surface 11a. The first and second step surfaces 11b, 11c are ellipsoidal outer circumferential surfaces slightly smaller than and similar in shape to the inner raceway surface 11a.

The first cylindrical spring 17 which is a roller-pressing member is fitted on the first step surface 11b, and the second cylindrical spring 18 which is a roller-pressing member is fitted on the second step surface 11c. The inside-diameter dimension of the first and second cylindrical springs 17, 18 is substantially the same as the outside-diameter dimension (major-diameter dimension) of the major axis Lmax of the first and second step surfaces 11b, 11c. The outside-diameter dimension of the first and second cylindrical springs 17, 18 is greater than the outside-diameter dimension (minor-diameter dimension) of the minor axis Lmin of the ellipsoidal inner raceway surface 11a. The first and second cylindrical springs 17, 18 may or may not be fixed to the ends of the major axis Lmax in the first and second step surfaces 11b, 11c. It is preferable for the springs to not separate sideways (in the direction of a center axis line 5a of the wave generator 5) from the first and second step surfaces 11b, 11c.

The first and second cylindrical springs 17, 18 fitted on the first and second step surfaces 11b, 11c are disposed coaxially with the rigid plug 12. As shown in the upper half portions of FIGS. 2(b) and 3(b), the springs are also positioned radially inward from the tight rollers 15a at the ends of the major axis Lmax. At the ends of the minor axis Lmin shown in the lower half portions, the loose rollers 15d are pressed radially outwards from the radially inner sides, and are pressed against the outer raceway surface 14a with a predetermined spring force. The loose rollers 15B in positions other than the ends of the minor axis positions Lmin can also be brought into contact with the outer raceway surface 14a by appropriately setting features such as the outside-diameter dimension of the first and second cylindrical springs 17, 18.

In the present example, one axial-direction end of each of the loose rollers 15B is pushed radially outward by the first cylindrical spring 17, and the other axial-direction end is pushed radially outward by the second cylindrical spring 18. Consequently, the axial-direction parts of the loose rollers 15B can be pressed against the outer raceway surface 14a with equal force.

Thus, the loose rollers 15B are pressed against the outer raceway surface 14a by the first and second cylindrical springs 17, 18. The loose rollers 15B constantly stay in line contact with the outer raceway surface 14a, and roll according to the rotation of the outer race 14. Consequently, skewing of the loose rollers 15B can be prevented or limited. As a result, it is possible to prevent skewed rollers 15 from moving to the major axis positions Lmax where they come to be in a tight state, and circumstances in which smooth rotation of the rollers 15 is inhibited can be avoided.

The material of the roller-pressing members can be, e.g., steel, stainless steel, phosphor bronze, or plastic.

Modification 1

In the wave generator 5 described above, first and second cylindrical springs 17, 18 were used as roller-pressing members. Ring springs 17A, 18A can also be used in place of the cylindrical springs 17, 18. FIG. 2(c) is a cross-sectional view showing a wave generator 5A using ring springs 17A, 18A which are circular in cross section, the upper half of the drawing showing a cross section of a major axis position and the lower half of the drawing showing a minor axis position.

Modification 2

Figure 4:
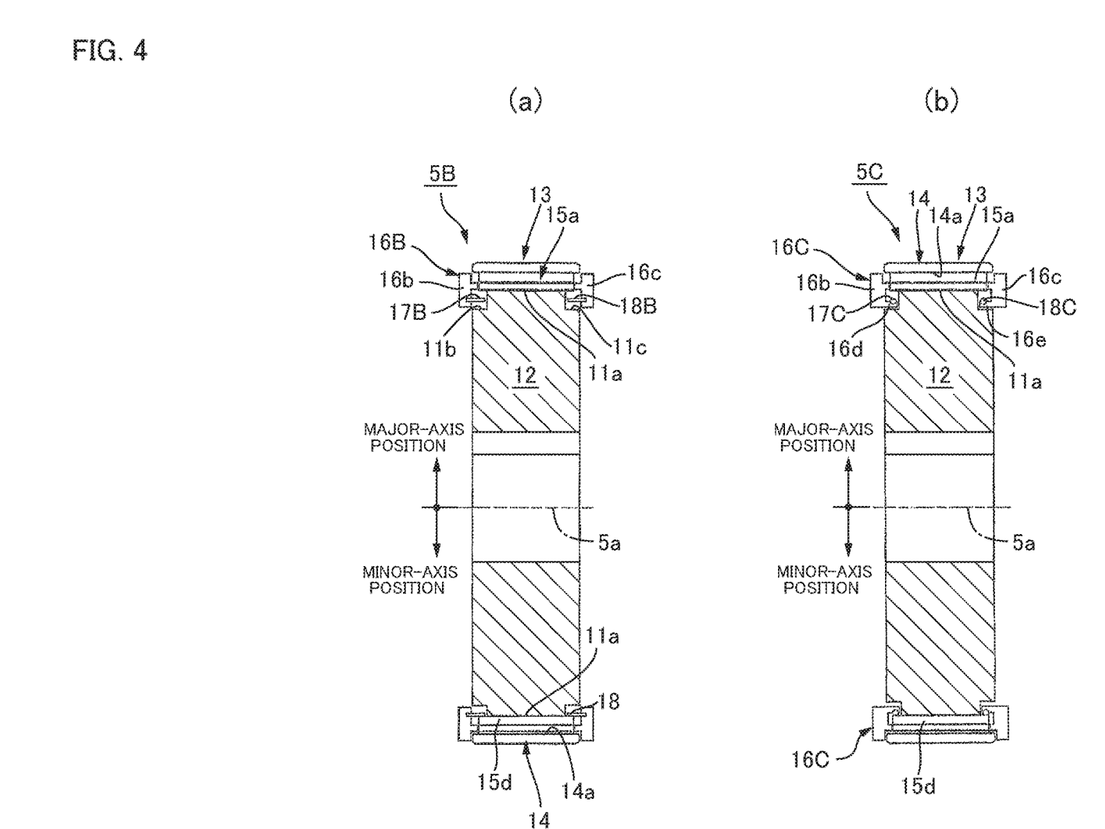

FIG. 4(a) is a cross-sectional view showing Modification 2 of the wave generator 5, the upper half of the drawing showing a cross section of a major axis position and the lower half of the drawing showing a minor axis position.

In the wave generator 5B of Modification 2 shown in FIG. 4(a), first and second cylindrical springs 17B, 18B as roller-pressing members are fitted on a roller retainer 16B. The basic configuration of the roller retainer 16B is the same as the roller retainer 16 of the wave generator 5. Annular end plate portions 16b, 16c at the sides of the roller retainer 16B extend radially inward toward the first and second step surfaces 11b, 11c. The first and second cylindrical springs 17B, 18B are attached to the inner side surfaces of these end plate portions 16b, 16c. The first and second cylindrical springs 17B, 18B thereby face the ends of both sides of the rollers 15 from the radially inner sides.

The inside-diameter dimension of the first and second cylindrical springs 17B, 18B is greater than the outside-diameter dimension of the first and second step surfaces 11b, 11c, so that the springs do not come into contact with the first and second step surfaces 11b, 11c. The outside-diameter dimension of the first and second cylindrical springs 17B, 18B is smaller than the major-diameter dimension of the inner raceway surface 11a, and greater than the minor-diameter dimension of the ellipsoidal inner raceway surface 11a.

The first and second cylindrical springs 17B, 18B attached to the roller retainer 16B are held to remain substantially as circles with the roller retainer 16B. The first and second cylindrical springs 17B, 18B are positioned on the radially inner sides of the rollers 15a at the end portions of the major axis Lmax, and are pressed against the rollers 15d at the end portions of the minor axis Lmin from the radially inner sides. The rollers 15d are thereby held in line contact while pressed with a predetermined spring force against the outer raceway surface 14a, and the rollers roll according to the outer race 14. The other loose rollers 15B are similarly held as being pressed against the outer raceway surface 14a in line contact. Consequently, instances in which the rollers 15 come to be skewed and smooth rotation of the rollers 15 is inhibited can be avoided.

Modification 3

FIG. 4(b) is a cross-sectional view of Modification 3 of the wave generator 5, the upper half of the drawing showing a cross section of a major axis position and the lower half of the drawing showing a minor axis position.

In the wave generator 5C of Modification 3 shown in FIG. 4(b), first and second ring springs 17C, 18C as roller-pressing members are fitted on a roller retainer 16C in place of the first and second cylindrical springs 17B, 18B. The basic configuration of the roller retainer 16C is the same as the roller retainer 16B described above. In the inner peripheral edges of the annular first and second end plate portions 16b, 16c on the sides of the roller retainer 16C, first and second ring-holding parts 16d, 16e are formed extending at right angles to the inner sides. The first and second ring springs 17C, 18C are respectively attached to the outer circumferential surface portions of these first and second ring-holding parts 16d, 16e. The first and second ring springs 17C, 18C thereby face the ends of both sides of the rollers 15 from the radially inner sides.

The inside-diameter dimension of the first and second ring springs 17C, 18C is greater than the outside-diameter dimension of the first and second step surfaces 11b, 11c, so that the springs do not come into contact with the first and second step surfaces 11b, 11c. The outside-diameter dimension of the first and second ring springs 17C, 18C is smaller than the major-diameter dimension of the inner raceway surface 11a, and greater than the minor-diameter dimension of the ellipsoidal inner raceway surface 11a. The first and second ring springs 17C, 18C thus configured yield the same effect as the first and second cylindrical springs 17B, 18B.

Modification 4

The roller-pressing members described above are cylindrical members or ring members. The roller-pressing members can also be manufactured cylindrical members or ring members that have been divided at one location in the circumferential direction thereof. In this case, the ends on both sides divided in the roller-pressing member are joined to one location in the outer circumferential surface portions positioned at the major-diameter ends in the outer circumferential surface of the rigid member. The joining of the both ends is carried out so as to establish a state in which, in the minor-diameter positions of the inner raceway surface of the inner race of the roller bearing made to flex along an ellipsoidal curve, the outside-diameter dimension of the roller-pressing member is greater than the minor-diameter dimension of the inner raceway surface in the minor-diameter positions.

Other Embodiments

The examples described above relate to a strain wave gear device comprising first and second rigid internally toothed gears. The wave generator of the present invention can also be applied to a strain wave gear device comprising a cup-shaped flexible externally toothed gear, as well as a strain wave gear device comprising a top-hat-shaped flexible externally toothed gear.

The examples described above relate to a strain wave gear device in which a flexible externally toothed gear is made to flex into a shape conforming to an ellipsoidal curve. The invention can also be applied to a strain wave gear device in which a flexible externally toothed gear is made to flex into a shape conforming to closed convex curve which is a non-circular curve other than an ellipsoidal curve. For example, the present invention can also be applied to a strain wave gear device in which a wave generator known as a three-lobe shape inscribed in a circle at three locations is used and a flexible externally toothed gear is made to mesh with a rigid internally toothed gear in three positions in the circumferential direction. In this case, the difference in the number of teeth between the rigid internally toothed gear and the flexible externally toothed gear is 3n (n being a positive integer).

The invention claimed is:
1. A wave generator of a strain wave gear device comprising:
   a rigid member having an outer circumferential surface with a contour defined by a non-circular curve;
   a roller bearing fitted to the outer circumferential surface and made to flex into a non-circular shape; and
   a roller-pressing member for pressing loose rollers disposed in a state of having some play in a radial direction between an outer race and inner race of the roller bearing, the loose rollers being pressed in a direction toward an outer raceway surface of the outer race;
   the non-circular curve being a closed convex curve inscribed in a circle at a plurality of locations at equiangular intervals.
2. The wave generator of a strain wave gear device according to claim 1, wherein the non-circular curve is an ellipsoidal curve.
3. The wave generator of a strain wave gear device according to claim 2, wherein the roller-pressing member is fitted to the rigid member.
4. The wave generator of a strain wave gear device according to claim 3, wherein
   the roller-pressing member is either a cylindrical member or a ring member,
   the roller-pressing member is disposed coaxially with the outer circumferential surface of an ellipsoidal shape, and
   an outside-diameter dimension of the roller-pressing member is greater than a minor-diameter dimension of an inner raceway surface of the inner race of the roller bearing made to flex along the ellipsoidal curve.
5. The wave generator of a strain wave gear device according to claim 3, wherein
   the roller-pressing member is either a cylindrical member or a ring member having a shape divided at a single location in a circumferential direction thereof, and
   ends on both sides divided in the roller-pressing member are joined to one location in outer circumferential surface portions positioned at major-diameter ends in the outer circumferential surface of the rigid member, so as to establish a state in which, in minor-diameter positions of an inner raceway surface of the inner race of the roller bearing made to flex along the ellipsoidal curve, an outside-diameter dimension of the roller-pressing member is greater than the minor-diameter dimension of the inner raceway surface in the minor-diameter positions.
6. The wave generator of a strain wave gear device according to claim 1, wherein
   first and second roller-pressing members are provided as the roller-pressing member,
   the first roller-pressing member urges one axial-direction end of each loose roller outward in the radial direction, and
   the second roller-pressing member urges the other axial-direction end of each loose roller outward in the radial direction.
7. The wave generator of a strain wave gear device according to claim 1, wherein the roller-pressing members is capable of elastically deforming in the radial direction.
8. The wave generator of a strain wave gear device according to claim 1, wherein a material of the roller-pressing member is either one of steel, stainless steel, phosphor bronze, and plastic.
9. The wave generator of a strain wave gear device according to claim 2, wherein
   the roller bearing has a roller retainer for holding each of the rollers at predetermined intervals along a circumferential direction in a raceway of the roller bearing, and the roller-pressing member is fitted to the roller retainer.

10. The wave generator of a strain wave gear device according to claim 9, wherein the roller-pressing member is either a cylindrical member or a ring member, the roller-pressing member is disposed coaxially with the outer circumferential surface of an ellipsoidal shape, and an outside-diameter dimension of the roller-pressing member is greater than a minor-diameter dimension of an inner raceway surface of the inner race of the roller bearing made to flex along the ellipsoidal curve.

11. The wave generator of a strain wave gear device according to claim 9, wherein first and second roller-pressing members are provided as the roller-pressing member, the first roller-pressing member urges one axial-direction end of each loose roller outward in the radial direction, and the second roller-pressing member urges the other axial-direction end of each loose roller outward in the radial direction.

12. The wave generator of a strain wave gear device according to claim 9, wherein the roller-pressing members is capable of elastically deforming in the radial direction.

13. The wave generator of a strain wave gear device according to claim 9, wherein a material of the roller-pressing member is either one of steel, stainless steel, phosphor bronze, and plastic.

14. A strain wave gear device comprising:
a rigid internally toothed gear;
a flexible externally toothed gear; and
the wave generator according to claim 1.

* * * * *